US008375039B2

(12) United States Patent
Schwartz et al.

(10) Patent No.: US 8,375,039 B2
(45) Date of Patent: *Feb. 12, 2013

(54) TOPIC CENTRIC MEDIA SHARING (75) Inventors: Jordan L. K. Schwartz, Seattle, WA (US); David R. Parlin, Redmond, WA (US); Tomasz S. M. Kasperkiewicz, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 795 days.

This patent is subject to a terminal disclaimer.

(21) Appl. No.: 11/464,028

(22) Filed: Aug. 11, 2006

(65) Prior Publication Data
US 2008/0040387 A1 Feb. 14, 2008

(51) Int. Cl.
G06F 7/00 (2006.01)
G06F 17/30 (2006.01)

(52) U.S. Cl. ........................................................ 707/758

(58) Field of Classification Search .............. 707/4, 101, 707/999.004, 999.101, 758
See application file for complete search history.

(56) References Cited

U.S. PATENT DOCUMENTS

| | | | |
|---|---|---|---|
| 5,742,816 A | 4/1998 | Barr et al. | |
| 6,757,684 B2 | 6/2004 | Svendsen et al. | |
| 6,850,247 B1 * | 2/2005 | Reid et al. ....................... | 345/611 |
| 6,970,859 B1 | 11/2005 | Brechner et al. | |
| 7,068,309 B2 | 6/2006 | Toyama et al. | |
| 7,069,310 B1 | 6/2006 | Bartholomew | |
| 2002/0112001 A1 | 8/2002 | Sutherland et al. | |
| 2003/0021591 A1 | 1/2003 | Grosvenor et al. | |
| 2004/0003090 A1 | 1/2004 | Deeds | |
| 2004/0044723 A1 | 3/2004 | Bell et al. | |
| 2004/0111415 A1 | 6/2004 | Scardino et al. | |
| 2004/0135894 A1 | 7/2004 | Shiota et al. | |
| 2004/0220965 A1 | 11/2004 | Harville et al. | |
| 2004/0230663 A1 | 11/2004 | Ackerman | |
| 2005/0033758 A1 | 2/2005 | Baxter | |
| 2005/0132288 A1 | 6/2005 | Kirn et al. | |
| 2005/0188399 A1 | 8/2005 | Tischer | |
| 2005/0262204 A1 | 11/2005 | Szeto et al. | |
| 2005/0289236 A1 | 12/2005 | Hull et al. | |
| 2006/0019702 A1 | 1/2006 | Anttila et al. | |
| 2006/0251339 A1 * | 11/2006 | Gokturk et al. .............. | 382/305 |

FOREIGN PATENT DOCUMENTS

KR 2006-99748 A 9/2006
WO WO/02/08926 1/2002

OTHER PUBLICATIONS

Jim McClellan, Tag Team, The Guardian, Feb. 3, 2005, (http://www.guardian.co.uk/technology/2005/feb/03/onlinesupplement2).*
Yahoo Inc, www.flickr.com, Dec. 7, 2004, (http://web.archive.org/web/20041207042157/http://flickr.com/photos/tags/).*
International Search Report, Dec. 12, 2007.

(Continued)

Primary Examiner — Alexey Shmatov
(74) Attorney, Agent, or Firm — Shook Hardy & Bacon, LLP (57) ABSTRACT Topic-centric-media sharing allows a user to search for and share media objects related to a topic. The user can select media objects stored on a client computing device to share with other users. The client computing device contains software that, in operation, searches for a set of media objects related to the same topic as the selected media objects. If such a set is located, the software on the client computing device can associate the selected media objects with the set. If no such set is located, the user can create a new set to share with other users.

17 Claims, 10 Drawing Sheets

OTHER PUBLICATIONS

"How to Get the Most Out of Flickr", http://flickr.com/get_the_most.gne#wedding, printed Mar. 16, 2006, 3 pgs., Copyright 2006 Yahoo! Inc.

"i Photo 6", http://www.apple.com/ilife/iphoto/features/photocasting.html, printed Mar. 16, 2006, 2 pgs., Copyright 2006 Apple Computer, Inc.

"Friends, Family and Groups", http://www.flickr.com/learn_more_4.gne, printed Apr. 6, 2006, 1 pg., Copyright 2006 Yahoo! Inc.

"Social Computing Group", http://research.microsoft.com/scg/, printed Apr. 6, 2006, 14 pgs., Copyright 2006 Microsoft Corporation.

Scott Counts (Microsoft Research) and Eric Fellheimer (Massachusetts Institute of Technology), "Supporting Social Presence through Lightweight Photo Sharing on and Off the Desktop", http://research.microsoft.com/users/scottlt/pubs/photo_sharing_chi04.pdf, 8 pgs., Copyright 2004 ACM 1-58113-702-8/04/0004.

Risto Sarvas (Helsinki Institute for Information Technology HIIT), "User-centric Metadata for Mobile Photos", http://pong.hiit.fi/dcc/papers/Sarvas_UserCentricMetadata_final.pdf, 3 pgs.

Carrie Burgener, Benjamin Hill and David Hong, "Assisted Metadata Propagation: Visualizing Contextual Metadata to Reveal Groupings," School of Information Management and Systems, University of California Berkeley, website http://www2.sims.berkeley.edu/academics/courses/is247/f05/projects/amp/AMPFinalWrite.

Marc Davis, Nancy Van House, Jeffrey Towle, Simon King, Shane Ahern, Carrier Burgener, Dan Perkel, Megan Finn, Vijay Viswanathan and Matthew Rothenberg, "MMM2: Mobile Media Metadata for Media Sharing," University of California at Berkeley School of Information Management and Systems, 102 South Hall, Berkeley, CA 94720-4600, Apr. 2-7, 2005.

* cited by examiner

TOPIC CENTRIC MEDIA SHARING

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Digital media can be categorized as any form of electronic media stored in digital code (e.g., binary, hexadecimal, etc.). Examples of digital media include digital photographs, audio clips, videos, television, etc. Advances in technology have brought change to the digital-media industry. Digital cameras, recorders, and camcorders are becoming more prevalent due to enhanced capabilities for capturing digital media. For instance, larger memories within digital-recording equipment provide larger capacities for storing digital media. Further, increased pixel resolutions provide better precision over film. Further still, numerous software programs present a myriad of options for editing digital media.

Technological advances are not the only catalysts bringing digital media to the mainstream. With the increased popularity of the Internet, e-mail, and other online services, conventional methods of sharing digital media have also become more sophisticated. Traditionally, users would have to develop film and distribute pictures manually. Today, a user can upload digital media from a computing device (e.g., camera, computer, phone, handheld device, etc.) to a web site or web service that stores the digital media on a server. Thereafter, the user can send other users an e-mail of the stored pictures or a link to a web page that displays the pictures.

Group events (e.g., weddings, concerts, etc.) are popular venues for capturing digital media. It is quite common for several people to take multiple digital photographs at a group topic. However, conventional methods of sharing the digital photographs are limited. Typically, a user will upload the photographs to a web site or web service and then e-mail a web link to others inviting them to view the photographs in an online photo album. Consequently, event attendees and other interested parties may receive several e-mails with links to different photo albums hosted on different web sites or web services. Further complicating the process, each web site or web service may have its own user interface ("UI"), feature set, or rules for viewing shared media. Sharing digital media in this manner creates a media-sharing experience centered around a user's online sharing space—not around a specific topic. Centering media sharing around a user makes it difficult to locate media objects related to a topic.

One drawback to user-centric-media sharing is that a user cannot readily search through online albums for a particular perspective or subject. The entire album is shared, limiting recipients to the media within the album and requiring the recipient to wade through various unwanted media objects. This can become extremely inefficient. For example, suppose an online album contained a number of photographs of various dogs but only two were of German Shepherds. When a user who is only interested in German Shepherds accesses the album, he/she must look through all of the pictures in the album. In addition, the user only gains access to the German Shepherd pictures in the album and cannot view or associate pictures with other shared media related to the breed.

While one user may take exceptional photographs of a topic, the media-sharing experience suffers without access to other users' media. When separate web sites or web services host media, conventional methods make it nearly impossible to create interesting perspectives of a given topic from digital media captured by multiple users. During a wedding, many pictures may be taken of the bride and groom. With a user-centric-media-sharing approach, a photo album cannot be created that includes all the pictures taken of the bride and groom.

Another drawback to user-centric-media sharing is that users can only view media for which they receive notice. Many attendees of a topic may not know each other—let alone be cognizant of other attendees' e-mail addresses or other contact information. If an attendee is unaware of another user's digital media, the attendee will not be able to view it.

Further, conventional media sharing does not permit automatically sharing digital media once it is added to a photo album. Users may wish to receive media objects of a particular topic once the media objects are associated with the topic. However, the user must wait for an e-mail containing the digital media or web link to the digital media. If the other user is unknown, the user cannot access the digital media.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The description provided herein generally relates to topic-centric-media sharing. Topic-centric-media sharing allows a user to search for and share sets of media objects associated with a topic. A system for topic-centric-media sharing may include a client computing device, server, and remote computing device that exchange information across a network. The client computing device presents a user with a user interface for selecting media objects to share with other users. The user selects which media objects to share with other users. The client computing device can search the server or a remote computing device for sets of media objects related to the same topic as the selected media objects. If such sets are located, the client computing device contains software configured to associate the selected media objects with sets located on the server or remote computing device.

Another application of the invention is a user interface for creating a topic-centric media sharing experience. The user interface contains an area for selecting media objects to share. Another area presents the user with options for creating a new set of media objects, adding selected media objects to a located set, or conducting a new search to locate additional sets.

Still another application of the invention is the ability to automatically distribute media objects relating to a given topic to users immediately after those media objects are associated with a set of media objects relating to the same topic. A user may subscribe to receive media objects from a single source (e.g., a feed from another user) or to a service for receiving media objects related to a specific topic from multiple sources (e.g., a feed of feeds). In addition, the user may designate recipient users to automatically receive the added media objects.

BRIEF DESCRIPTION OF THE SEVERAL VIEWS OF THE DRAWINGS

The present invention is described in detail below with reference to the attached drawing figures, wherein.

DETAILED DESCRIPTION

The subject matter described herein is presented with specificity to meet statutory requirements. However, the description herein is not intended to limit the scope of this patent. Rather, it is contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

In general, the present invention relates to topic-centric sharing of media objects over a network. Media objects can be categorized as any form of electronic media stored in digital code (e.g., binary, hexadecimal, etc.). For example, media objects include, without limitation, digital photographs, digital audio files, digital video, digital television, etc. Embodiments should not be limited, however, to any particular type of media object, as numerous types are evident to one skilled in the art. Furthermore, while media objects are described throughout this description in the plural form, media objects, as used herein, also contemplate embodiments with a single media object (e.g, one digital photograph).

As previously stated, the media-sharing experience suffers without access to other users' media. Embodiments presented herein are directed to sharing media objects in a topic-centric fashion. Topic-centric-media sharing refers to sharing sets of media objects related to the same topic with known or unknown users. A topic can be any location, event, subject, or the like. Examples of topics include, without limitation, a wedding, rock concert, birthday, city, war, or the like. Examples of topics include events such as the lakes in America, city landmarks, the Statue of Liberty, the Grand Canyon, pets, mountaineering, or the like. The same topic, as referred to herein, should not necessarily be construed to imply an exact time, place, happening, or the like. Rather, the same topic refers to an occasion, occurrence, event, happening, or the like in which media objects are captured. For example, photographs depicting the ceremony and reception of a wedding illustrate the same topic (i.e., the wedding). Videos of opening and closing acts at a concert would also stem from the same topic.

Having briefly described a general overview of the embodiments described herein, an exemplary operating environment is described below.

Figure 1:
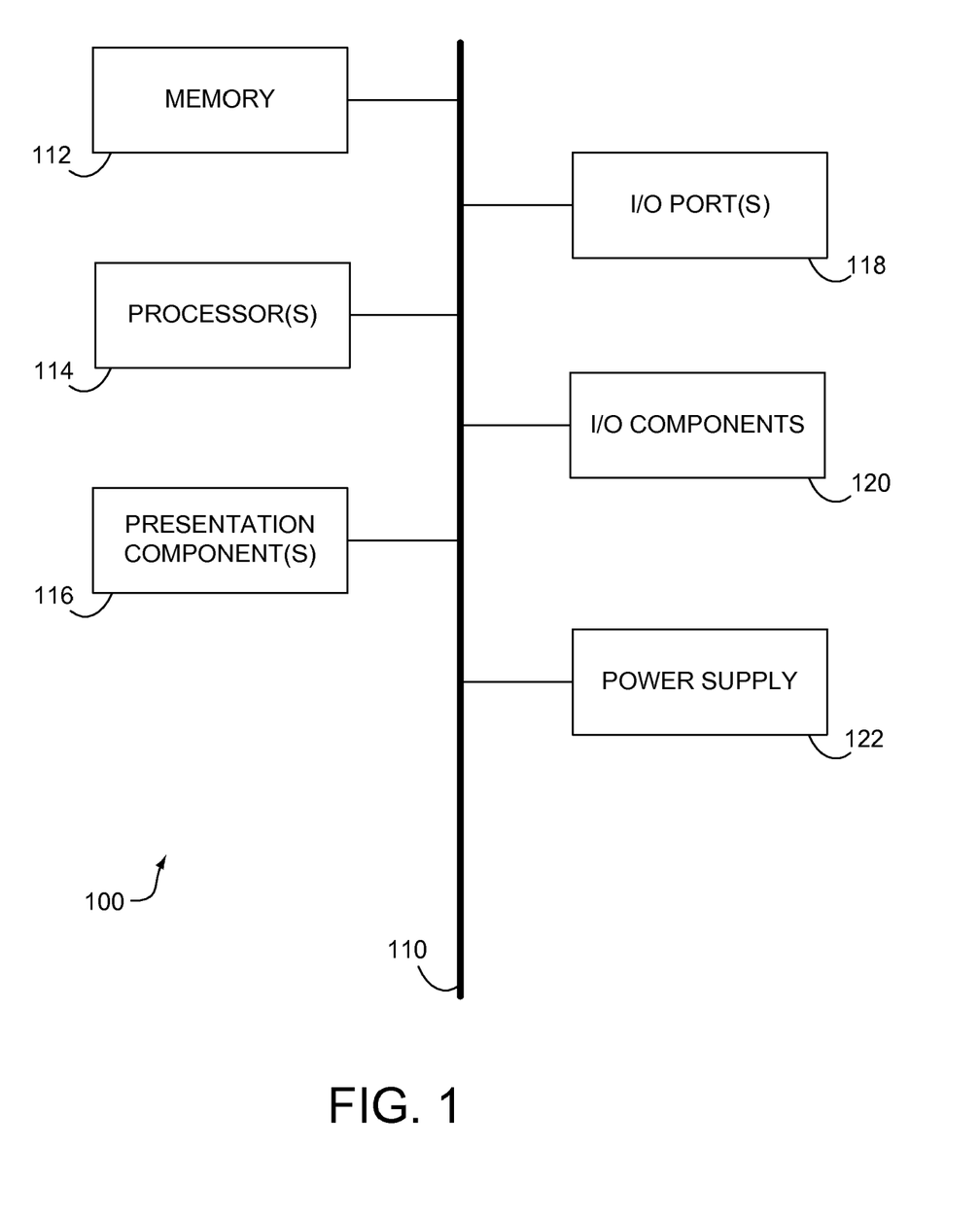
FIG. 1 is a block diagram of a computing-system environment for use in implementing an embodiment of the present invention.

Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing-environment 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal digital assistant ("PDA") or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following elements: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. It should be noted that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage, or other magnetic storage devices, that can be used to encode desired information and be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
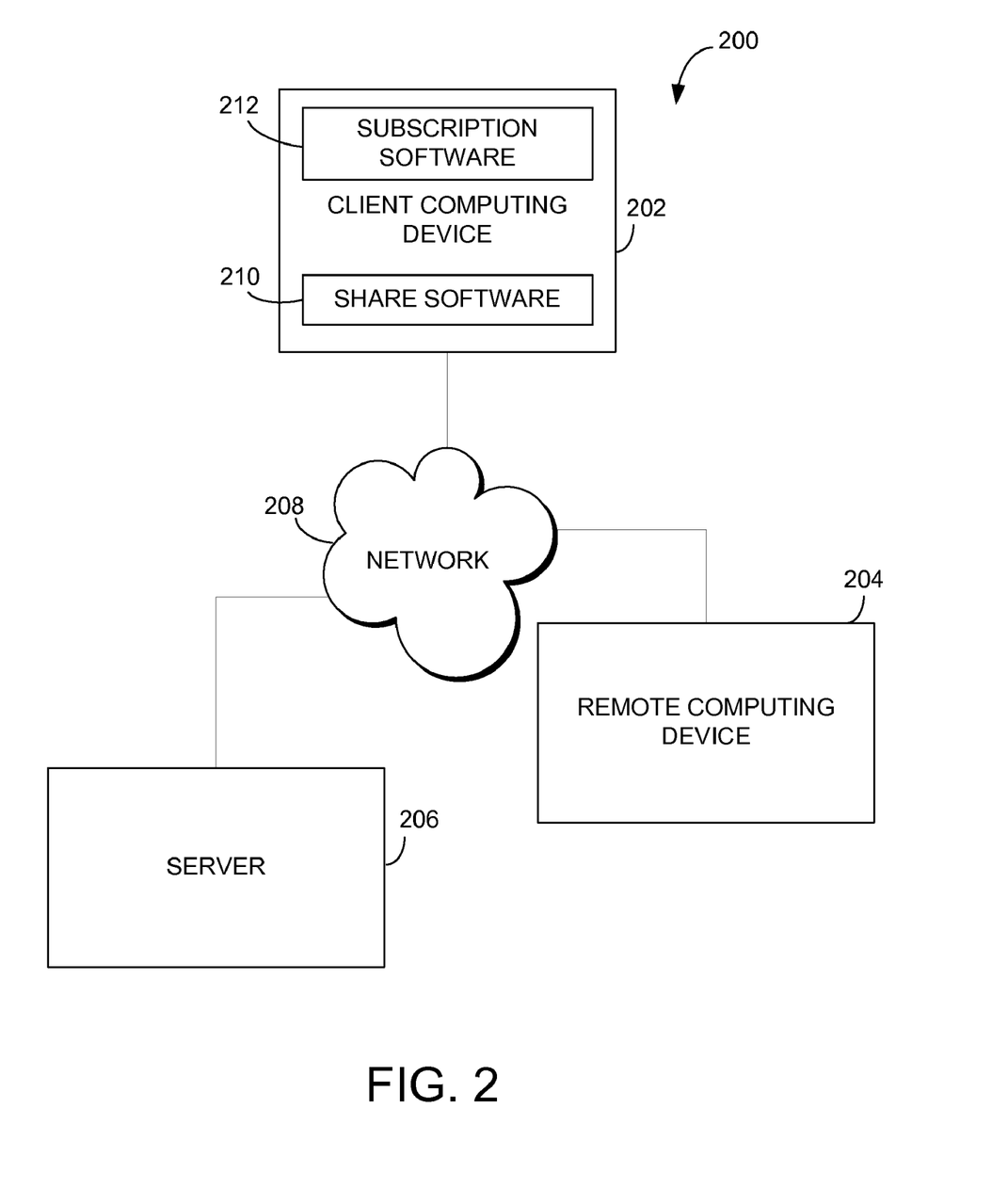
FIG. 2 is a block diagram of a networking environment for use in implementing an embodiment of the present invention.

Referring now to FIG. 2, a block diagram is illustrated that shows a networking environment for use in implementing an embodiment of the present invention. It will be understood and appreciated by one of ordinary skill in the art that the overall system architecture 200 shown in FIG. 2 is merely an example of one suitable networking environment and is not intended to suggest any limitation as to the scope of use or functionality of the present invention. Neither should the overall system architecture 200 be interpreted as having any dependency or requirement related to any single component or combination of components illustrated therein.

In an embodiment, system 200 includes a client computing device 202, remote computing device 204, and a server 206 connected via a communications network 208. Both the client computing device 202 and the remote computing device 204 may be any type of computing device, such as device 100 described above with reference to FIG. 1. By way of example only and not limitation, either client computing device 202 and/or the remote computing device 204 may be a personal computer, desktop computer, laptop computer, handheld device, consumer electronic device, or the like. It should be noted, however, that the invention is not limited to implementation on such computing devices, but may be implemented on any of a variety of different types of computing devices.

The client computing device 202 is configured to store a user's media objects. The user may upload media objects to the client computing device 202. The client computing device 202 may be configured to submit queries and requests for sets of media objects. In addition, client computing device 202 may be configured to receive data identifying sets. Furthermore, the client computing device 202 may also be configured to receive media objects pushed over the network 208 from the remote computing device 204 or the server 206. In a further embodiment, client computing device 202 pulls media objects from the remote computing device 204 or the server 206

The remote computing device 204 stores media objects other users are sharing. The remote computing device 204 may be a single computing device or multiple computing devices. In addition, the remote computing device 204 may be configured to receive media objects from the client computing device 202 or the server 206 via network 208. In an embodiment, the remote computing device 204 is further configured to receive and process queries for the media objects stored within its memory.

Various methods for uploading media objects to the client computing device 202 and the remote computing device 204 are well known to one of ordinary skill in the art. By way of example only and not limitation, media objects may be uploaded to the client computing device 202 or remote computing device 204 using a universal serial bus ("USB") connection, wireless connection, digital subscriber line ("DSL"), Ethernet cable, mobilephone service, or the like. In an embodiment, the user may transfer digital photographs from a camera to the client computing device 202 via a USB cable. In another embodiment, the user transfers a digital video file to the client computing device 202 using a digital mobile network. Embodiments are not limited, however, to any particular method or device for uploading media objects to the client computing device 202 or the remote computing device 204.

The server 206 is configured to receive queries to locate a set of media objects related to the same topic as media objects stored on the client computing device 202. The server 206 may be an application server dedicated to running a topic-centric media sharing application. For example, the server 206 may host a web service for locating sets of media objects of the same topic as media objects on the client computing device 202. In another embodiment, the server 206 is a database server that provides database storage and lookup services. In this capacity, the server 206 may store a myriad of media objects submitted by different users. For example, the server 206 may store sets of media objects and allow the client computing device 202 access when the sets are requested. The server 206 may also store pointers to address locations of media objects. Additionally, the server 206 can store parameters (such as a date, time indication, location indication, or other electronic attribute) of media objects. Specifically, a time indication may include a specific time (e.g., 9:00am, 21:45 CST, etc.) or a quantity of time (e.g, five minutes, thirty seconds, etc.). A location indication may include any specific geographic location (e.g., a park, city, reception hall, etc.) or relative geographic location (e.g., fifty feet, one mile, etc.). Parameters may also include ranges of information. A set may include a range of specific or quantified times associated with multiple media objects. For example, if the set includes three photographs taken at 1:00am, 1:30am, and 1:45am, the set may include a time parameter of 1:00-1:45am. The aforementioned parameters or any combination of parameters (e.g., a time location and a location indication) can be used by the client computing device 202 or the server 206 to search for relevant sets.

Each set may also include parameters identifying all of the media objects within the set. In some embodiments, parameters of the set may be assigned by the computing device storing them or by the service managing them. For example, a web site may be configured to automatically associate a set with any of the parameters shared by the media objects within the set. In an alternative embodiment, the user is prompted to designate the parameters of the set.

In one embodiment, system 200 allows a user to select media objects on the client computing device 202. The client computing device 202 then either searches the remote computing device 204 or submits a query or request to the server 206 or the remote computing device 204 for sets of media objects related to the same topic as the selected media objects. If such a set exists, the user can then associate the selected media objects with the set. If such a set does not exist, the client computing device 202 is configured to create a new set which may be stored on the client computing device 202, on the server 206, or on the remote computing device 204.

The network 208 includes any communications network along with necessary components. The network 208 includes LAN, WAN, peer-to-peer, wireless, digital mobile, DSL, the Internet, and other such networks. Such networks are well known to one skilled in the art.

As further shown in FIG. 2, share software 210 executes on the client computing device 202. In general, share software 210 is a set of machine-useable code that, in operation, allows a user to share the media objects stored on the client computing device 202 with other users. In an embodiment, share software 210 is embedded within a multimedia-management program stored on the client computing device 202. Share software 210 may be embedded within an operating system or an application program and provide the functionality to share media objects managed by such a program. In another embodiment, share software 210 is integrated directly within the operating system of client computing device 202. This configuration would allow multiple applications within the client computing device 202 access to share software 210.

Share software 210 may be configured to constrain a search for relevant media objects to one or more groups or relationship constraints. For example, the search can be limited to members within a group such as a messenger list, buddy list, or the like. This reduces searching computations by giving more deference to media objects shared by members within the group. Relationship constraints may include a pattern of users frequently shared with, a common location or time media objects are captured, a number of times a user is called on a phone, or other parameter.

Share software 210 may also be configured to associate media objects automatically without any explicit user action. In one embodiment, two media objects are associated with one another upon a determination that they each contain one or more parameters in common. In the same embodiment, for example, share software 210 can be configured to recognize that the two media objects are taken at the same time and location.

Additionally, subscription software 212 may operate on the client computing device 202. In general, subscription software 212 is a set of computer-readable code that, in operation, allows a user to register to receive media objects associated with one more or more sets from the remote computing device 204 or the server 206. In an embodiment, subscription software 212 is embedded within a multimedia-management program stored on the client computing device 202. Alternatively, subscription software 212 may be embedded within an operating system or an application program and provide the functionality to register remote users to receive media objects. In another embodiment, subscription software 212 is directly integrated within the operating system of the client computing device 202. This configuration would allow multiple applications within the client computing device 202 to access subscription software 212.

Subscription software 212 may be configured to constrain a registration for reception of media objects to one or more groups or relationship constraints. For example, the registration can be limited to members within a group such as a messenger list, buddy list, or the like. This allows the user to control the remote users receiving the media objects.

While FIG. 2 illustrates share software 210 and subscription software 212 executing on the client computing device 202, share software 210 and/or subscription software 212 may also execute on the server 206. For example, a web site may offer the functionality of topic-centric media sharing and registering to receive media objects from a set. In such an example, both share software 210 and subscription software 212 would be stored on a web server and accessible from a plurality of computing devices.

Figure 3A:
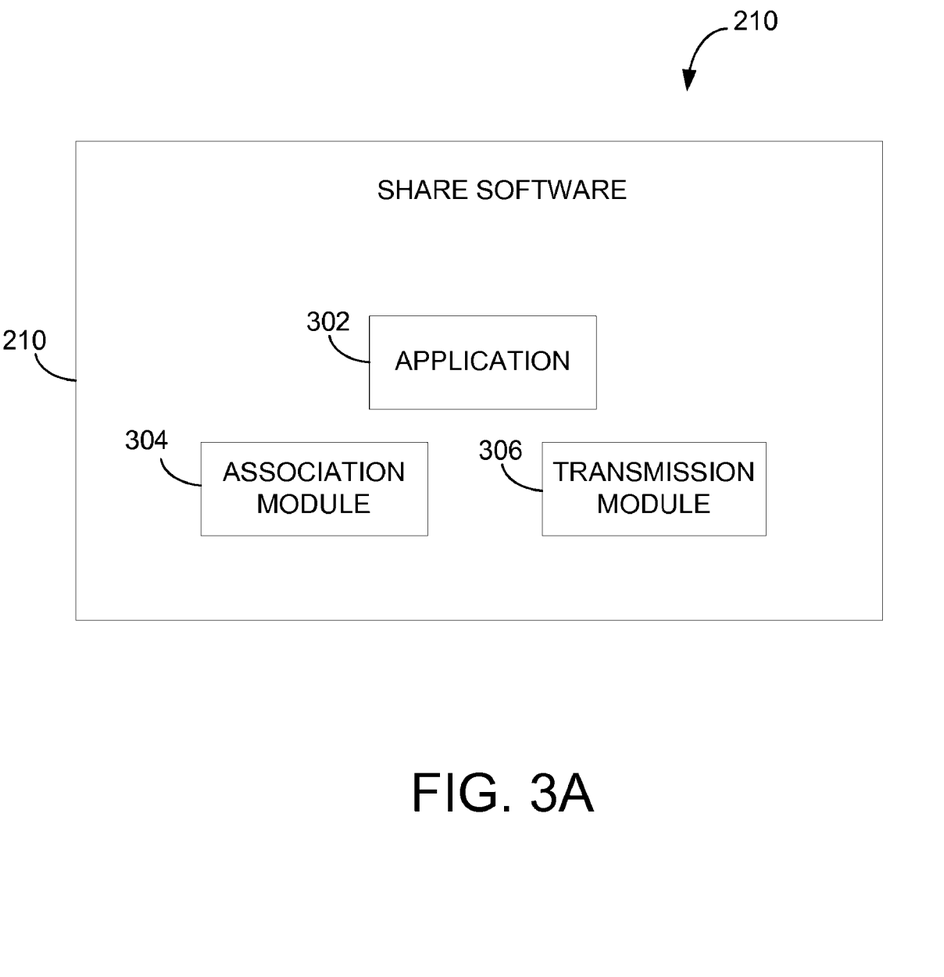
FIG. 3A is a block diagram of share software according to an embodiment of the present invention.

FIG. 3A illustrates an exemplary block diagram of share software 210 according to embodiments of the present invention. Share software 210 may include an application 302, an association module 304, and a transmission module 306, which are all computer-executable programs. In one embodiment, the application 302, the association module 304, and the transmission module 306 are implemented as stand-alone modules. In other embodiments, the application 302, the association module 304, and the transmission module 306 may be integrated directly into an operating system. Even though FIG. 3A illustrates all three modules separately, any combination of the application 302, the association module 304, and the transmission module 306 may exist in a single module. Alternatively, the transmission module 306 may exist on the client computing device 202 outside of the share software, such as by a standard set of protocols and plug-ins for transmitting media objects across a network. Moreover, the application 302 and the association module 304 may exist on separate computing devices. For example, the server 206 may contain the association module 304, while the client computing device 202 contains the application module 302.

In operation, the application 302 performs multiple functions. Media objects stored on the client computing device 202 are presented to the user via a standard graphical user interface, such as the one illustrated in FIG. 6A. The user may select media objects to share with other users. Once media objects are selected, the application 302 searches (by submitting a query or request) for sets of media objects relating to the same topic as the selected media objects. The application 302 then presents the option to search for sets in the form or drop-down-menu selections, graphical buttons, text fields, or other means for conveying the user's choice. The application program can also be set to automatically search for sets of media objects whenever media objects are uploaded to the client computing device.

The application 302 searches for sets by submitting requests or queries to the remote computing device 204 or server 206. Queries may be sent (via the transmission module 306) for processing to the server 206 to determine if a set of media objects of the same topic as the selected media objects exists. Queries may also be sent (via the transmission module 306) to the remote computing device 204 to determine if a set of media objects of the same topic as the selected media objects exists. In addition, the application 302 may submit a request to the remote computing device 204 to determine if a set of media objects relating to the same topic as the selected media objects exists.

If such a set does exist, the set's title and destination are transmitted back to the client computing device 302, wherein the user is notified of the set and given the option to associate the media objects therewith. In embodiments, the set's destination may include an internet protocol ("IP") address, virtual-memory address, peer-to-peer network address, or other network address designating the memory locations of a located set.

In an embodiment, the application 302 transmits a request or query for sets with parameters of the selected media objects via transmission module 306 through network 208 for comparison on the server 206. Examples of parameters include time stamps, metadata, dates, locations (e.g., as specified by a global positioning system ("GPS") device), titles, captions, or the like. One skilled in the art is aware of various electronic attributes that can be used as parameters. Accordingly, embodiments are not limited to any particular query parameter.

An issue arises, however, when the application 302 attempts to search everything connected to network 208. This could potentially include the searching of an enormous number of sets of media objects. To restrict the magnitude of searches or queries, the application 302 can be limited to search media objects shared by individuals in a group associated with the user. Examples of such groups include, without limitation, people contained in an address book, web group, buddy-list, or the like.

The association module 304 associates the selected media objects to a set of media objects upon instruction by the user. In an embodiment, the association module 304 uploads (via transmission module 306) copies of the selected media objects to a memory location on server 206 that stores pointers to all media objects within the set. In another embodiment, the association module 304 tags the selected media objects to designate affiliation with the set. It is evident to one skilled in the art that various tags exist for tagging the selected media objects. For example, the association module 304 may use tags provided by an operating system. Embodiments are not limited, however, to any specific tag, tagging method, or operating system.

The transmission module 306 is configured to transmit media objects as well as tags and pointers to the media objects. Additionally, the transmission module 206 may also transmit queries for sets of media objects. In one embodiment, the transmission module 306 transmits the selected media objects to a remote storage module where the set is located.

Figure 3B:
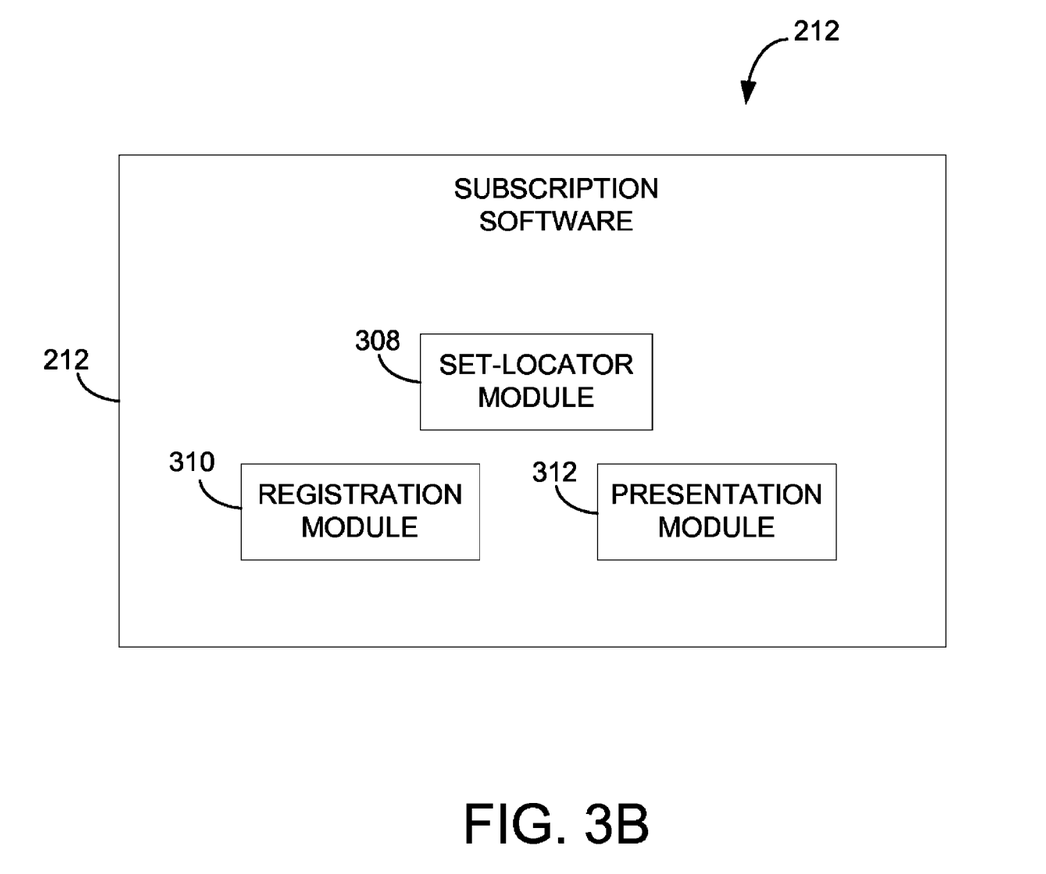
FIG. 3B is a block diagram of subscription software according to an embodiment of the present invention.

FIG. 3B is a block diagram of subscription software according to an embodiment of the present invention. Subscription software 212 may include a set-locator module 308, a registration module 310, and a presentation module 312, which are all computer-readable programs. In one embodiment, the set-locator module 308, the registration module 310, and the presentation module 312 are implemented as stand-alone modules. In another embodiment, the set-locator module 308, the registration module 310, and the presentation module 312 are integrated directly into an operating system. Even though FIG. 3B illustrates all three modules separately, any combination of the set-locator module 308, the registration module 310, and the presentation module 312 may exist in a single module. Alternatively, the presentation module 312 may exist on the client computing device 202 outside of the share software, such as by a standard set of protocols and plug-ins for transmitting media objects across a network. Moreover, the set-locator module 308 and the registration module 310 may exist on separate computing devices. For example, the server 206 may contain the set-locator module 308 while the client computing device 212 contains the registration module 310.

In operation, the set-locator module 308 performs multiple functions. In one embodiment, the set-locator module 308 searches for sets with one or more parameters similar to the parameters of the media objects selected by the user. For example, the set-locator module 308 may search for sets of media objects containing a time indication, location indication, or a combination thereof. Searches may be conducted by submitting a query to the remote computing device 204 or the server 206. In one embodiment, the client computing device submits the query to the remote computing device via a peer-to-peer network. Other methods of submitting the request over a network—such as those delineated herein—are also possible.

The registration module 310 is configured to register the user to receive the media objects associated with sets located by the set-locator module 308. In one embodiment, registration occurs without any input from the user. In another embodiment, the user is prompted whether to receive media objects associated with the set. If the user decides to receive media objects from the set, the registration module 310 registers the user with the set using the registration module 310. The registration module 310 may be a service, application, or other set of computer-readable instructions capable of enabling the user to receive media objects associated with the set. The registration module 310 may include, without limitation, subscription buttons, really simple syndication ("RSS") feed buttons, extensible markup language ("XML") feed buttons, or the like. Other registration applications are well known to those skilled in the art.

The registration module 310 may be hosted on the client computing device 202, the remote computing device 204, or the server 206. If on the server 206, the user may have to submit a request from the client computing device 202 to the server 206 to register with a set. The request may include any number of registration parameters, such as user name, password, IP address, proprietary token, or the like. In an embodiment, the server 206 uses the request to authenticate the user before registering him/her to receive a set. If the registration module 310 is hosted on the remote computing device 204, the request may have to be sent across a peer-to-peer network.

Additionally, the registered users may receive newly-associated media objects to the set. In some embodiments, newly-associated media objects may be discovered by polling the remote-computing device 204 or the server 206. Various other methods for transmitting media objects to the user are well known to those skilled in the art. Examples include, without limitation, push, pull, or push-pull methods of transmission.

The presentation module is configured to notify the user of received media objects. The presentation module 312 may include any driver, application, or service for presenting the user with the received media objects. For example, presentation module 312 may include an e-mail provider, ring tone, or the like.

Figure 4:
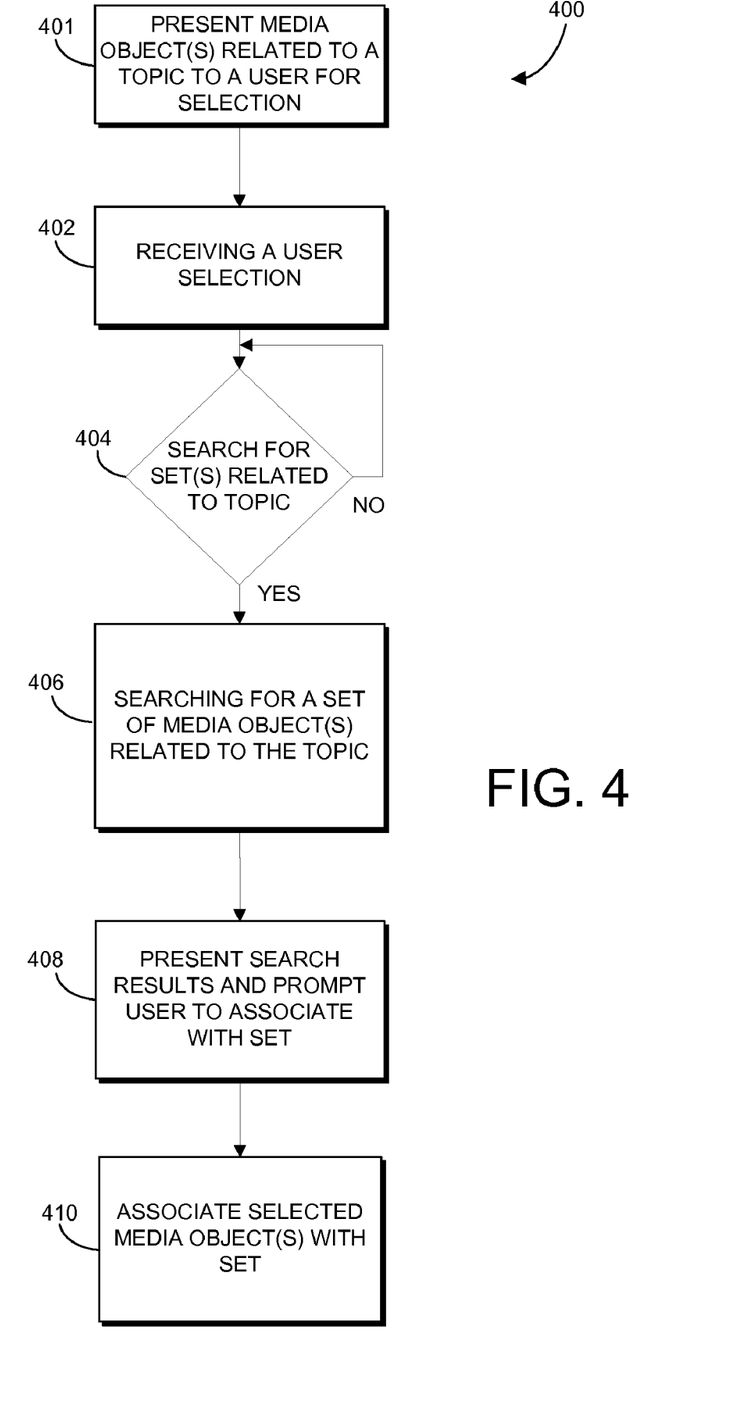
FIG. 4 is a flow diagram illustrating a method for sharing media objects, according to an embodiment of the present invention.

Referring now to FIG. 4, a flow diagram is illustrated that shows an exemplary method 400 for topic-centric sharing of media objects. Initially, the media object(s) stored on the client computing device are presented to the user via a GUI, indicated at block 401. The user can then select one or more media objects to share. The user's selections of media objects are received, indicated at block 402. Selection of media objects can be done by highlighting, mouse-clicking, or some other well known method.

Figure 6A:
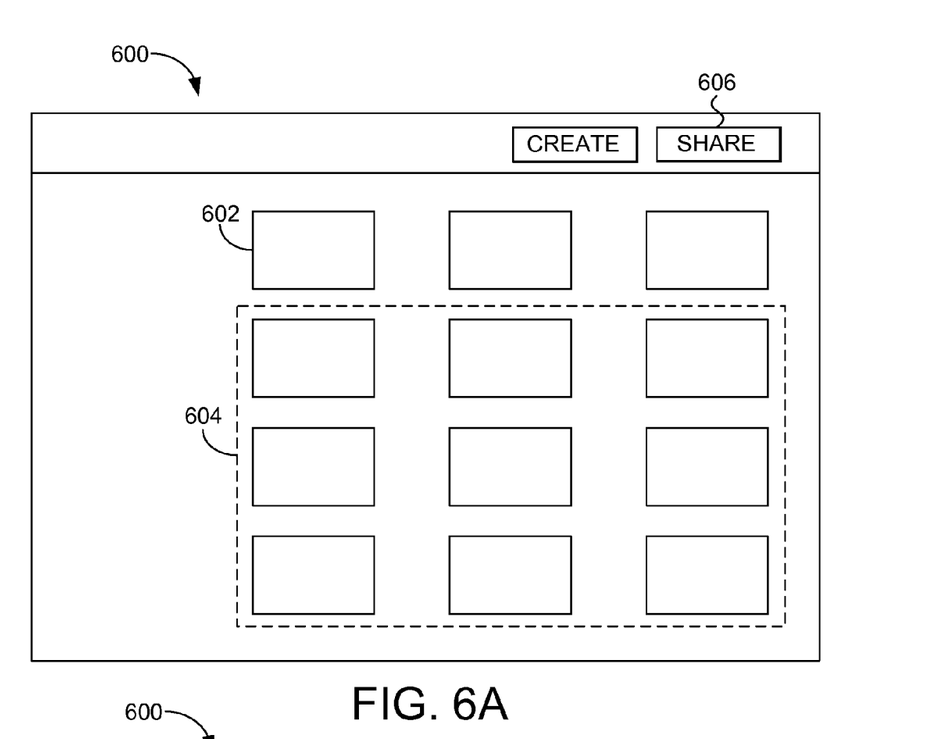
FIG. 6A is an exemplary interactive display of a user interface, according to an embodiment of the present invention.

The user must then determine whether to search for sets of media objects related to the topic of the selected media objects. This is indicated at decision block 404. In an embodiment, a designated button embedded in a user interface, such as a share button 606 in FIG. 6A, is provided for initiating a search for the sets. In another embodiment, the selected media objects remain selected (as indicated by the NO path) until the user initiates a search (as indicated by the YES path). In still another embodiment, a search is automatically initiated once media objects are selected.

Upon initiation of a search, the application 302 searches for sets of media objects related to the same topic as the selected media objects—as indicated at block 406. In an embodiment, a search is performed by submitting a query to a remote computing device or server for sets of media objects containing parameters similar to the selected media objects. As previously mentioned, parameters of the selected media objects are compared with the parameters of the media objects within a set. In an alternative embodiment, the client computing device receives updates of sets of media objects and searches locally. In still another embodiment, the client computing device searches for an identifier media object associated with the topic. An identifier media object may be any media object identifying a topic. For instance, a bar code designating a topic may be captured on a digital photograph. Instead of searching for parameters, the client computing device could search for media objects associated with the bar code. Embodiments are not limited, however, to any particular search technique or identifier media object.

After the search, at 408, the user is presented with the search's results (including possible matching sets) and prompted to associate the selected media objects with a set. If the user wishes, the selected media objects may be associated with the set, as indicated at block 410. Association may occur by storing the selected media objects in memory (either on the client computing device or the server) designated for the matching set. Also, the selected media objects may be tagged to designate affiliation with the matching set. Moreover, pointers to the media objects may be stored to designate association.

Additionally, at 408, the user may be presented with other options. For example, the user may be presented with the option to create a new set for the selected media objects. When the user initiates such a process, the selected media objects are associated with one another using any of the aforementioned methods. The media objects may be stored either on the client computing device or uploaded to a server. Alternatively, at 408, the user may also be prompted with the option to submit another search for additional sets of shared media objects. Such a search may be conducted using any of the aforementioned methods.

In addition, the user may subscribe to a service that automatically delivers media objects once they have been associated with a set—in other words the user subscribes to a feed of media objects. This service may be managed by the server or the client computing device, and associated media objects may be delivered using a push, pull, push-pull, or similar method. In one embodiment, the user subscribes to the service specifying a desire to receive newly associated media objects of a particular set (e.g., "Jack and Jill's Wedding Reception").

In another embodiment, the user subscribes to a multiple-feed service that searches various other services for newly-associated media objects—in other words subscribing to a feed of feeds. In this embodiment, the multiple-feed service automatically subscribes users to different sets of media objects that are sharing media objects containing a specific parameter. For example, without limitation, subscription to a multiple-feed service may subscribe a user to a myriad of sets that are sharing media objects about a topic, and automatically deliver newly-associated media objects in the those sets.

Figure 5:
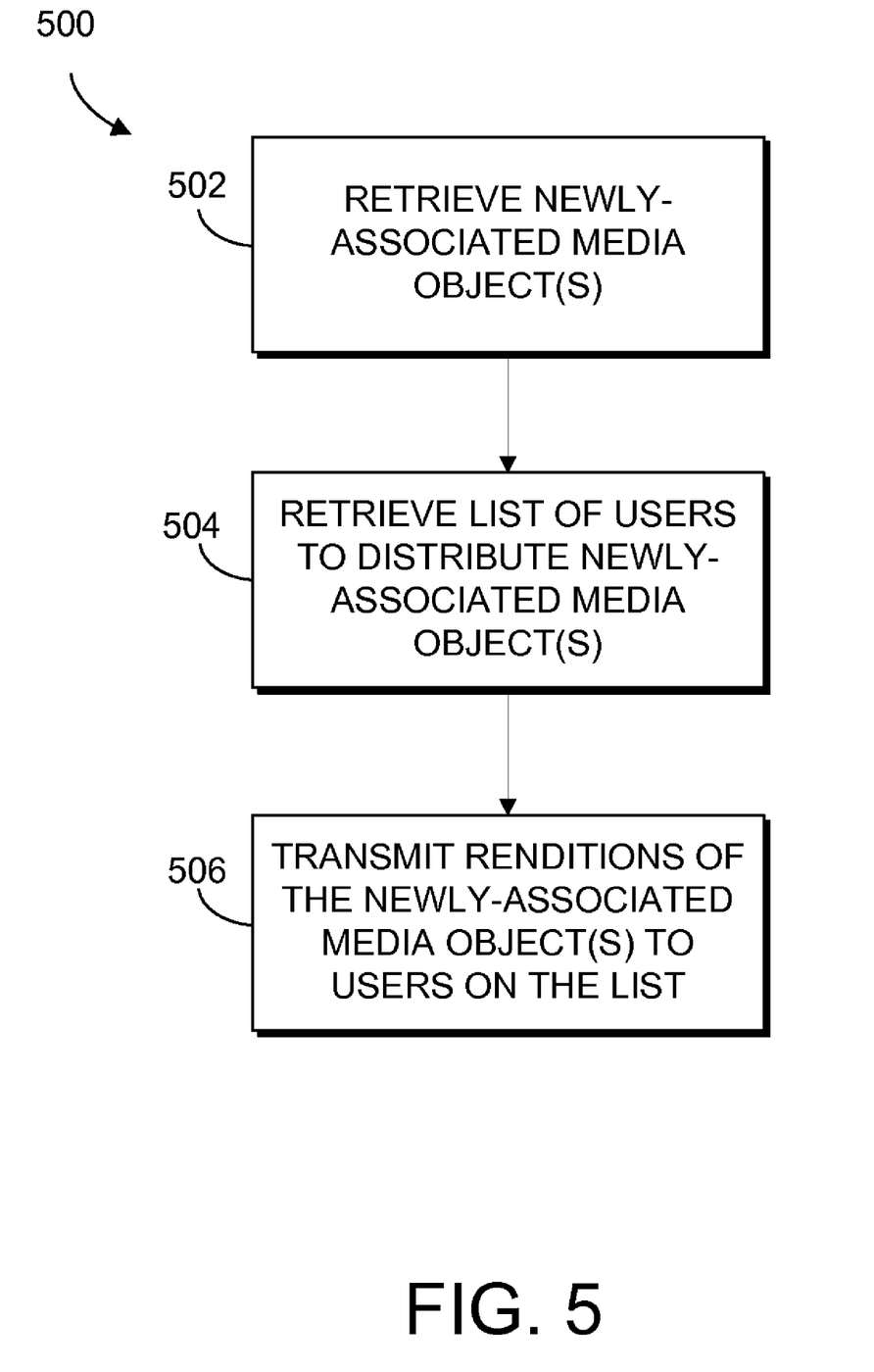
FIG. 5 is a flow diagram illustrating an embodiment of the present invention for automatically distributing newly-associated media objects to users.

Referring now to FIG. 5, a flow diagram is illustrated that shows an exemplary embodiment for automatically distributing newly-associated media objects to users. Many users may wish to automatically receive images added to a set. As stated above, conventional media sharing does not permit automatically sharing digital media once it is added to a photo album.

In general, method 500 is directed to automatically sharing newly-associated media objects. Newly-associated media objects include media objects that have just been added to a set of media objects. Method 500 begins by retrieving newly-associated media objects, as designated by block 502. Sets of newly-associated media objects may be monitored on the server side. Alternatively, such sets can also be monitored on the client side. Subsequently, a list of users to distribute the newly-associated media objects is retrieved, as illustrated at block 504. Such a list may be extracted from the server or the client computing device.

Once the list of users is retrieved, the newly-associated media objects are transmitted to the users specified in the list, as indicated at block 506. Various methods for transmitting media objects over a network are well known to one skilled in the art. For example, new photographs can instantly be e-mailed to recipient users on the list. Alternatively, the user may pull the newly-associated media objects from a server or remote computing device. Moreover, a service on the client computing device may periodically request newly-associated media objects for given sets.

Figure 6B:
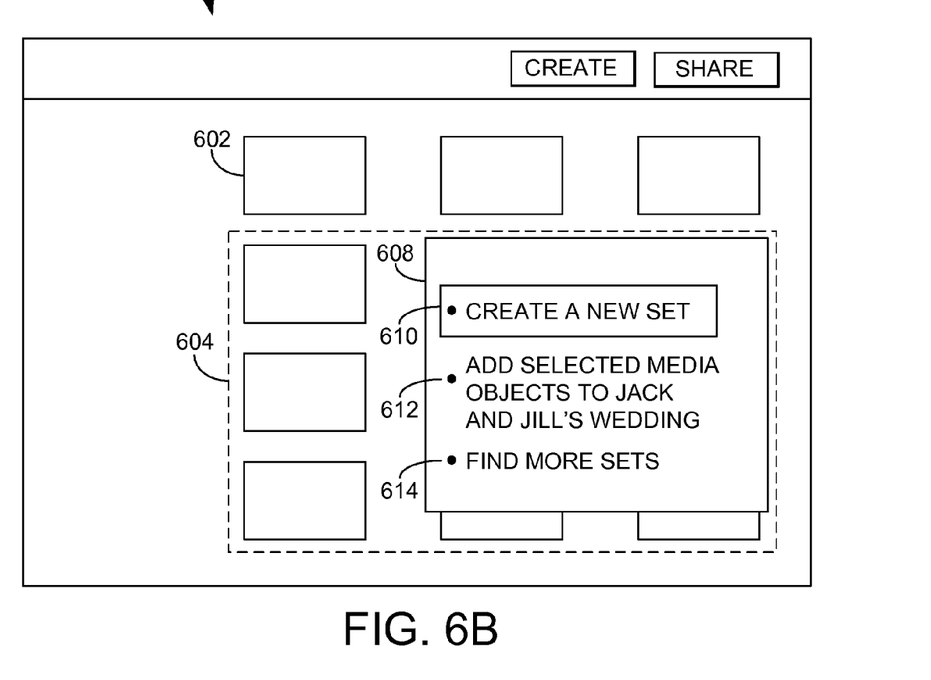
FIG. 6B is an exemplary interactive display of a user interface, according to an embodiment of the present invention.
Figure 6C:
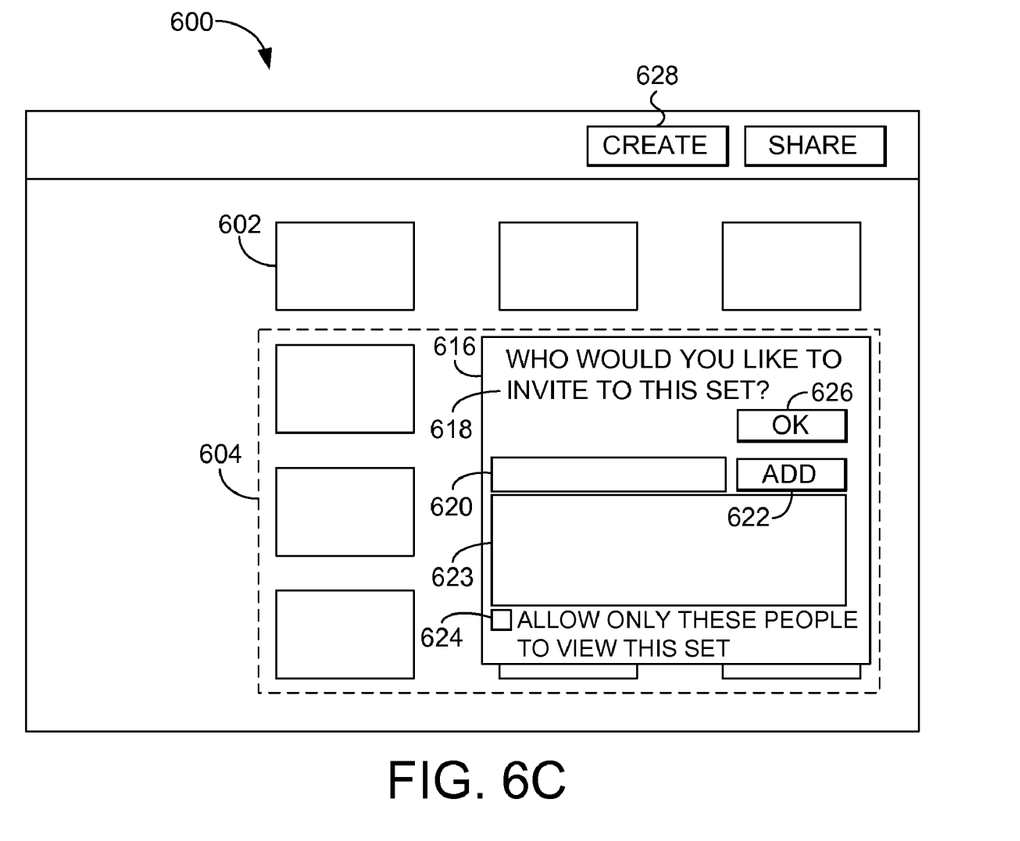
FIG. 6C is an exemplary interactive display of a user interface, according to an embodiment of the present invention.

FIGS. 6A, 6B, and 6C illustrate exemplary interactive displays of a user interface 600, according to various embodiments of the present invention. Turning initially to FIG. 6A, the user interface may display media objects 602 that are stored or accessible by the client computing device 202. While FIG. 6A depicts media objects 602 in thumbnail form, it is readily apparent to one skilled in the art that other display forms are also possible.

Any combination of the media objects 602 can be selected by the user. In FIG. 6A, a highlight 604 appears around the media objects 602 selected by the user. While highlight 604 is shown as a dotted-line border encompassing the selected media objects 602, embodiments are not limited to any specific type of control. Once selected, the user can initiate a search for one or more sets of media objects by triggering the share button 606.

Referring now to FIG. 6B, an option window 608 presents multiple options to the user after the search is performed. The options may be presented to the user in a selectable list; however, various other presentation methods are well known in the art and also possible. A create option 610 allows a user to create a new set of media objects with the selected media objects. An add option 612 presents sets found by the search and allows the user to add the selected media objects to the sets. The set's title (e.g., "Jack and Jill's Wedding") is displayed to the user. Also, an indicator box may be applied when the add option 612 whenever a mouse pointer is directed over the add option 612. A search option 614 triggers a new search for additional sets of media objects that could match the selected media objects. New searches can be initiated by directing a mouse pointer over the search option 614 and left-clicking the search option.

Referring now to FIG. 6C, an addressee window 616 is presented when the user selects the create option 610. The addressee window 616 may include a title 618, a text entry field 620, an add button 622, an invitee display window 614, an exclusivity option 624, and OK button 626. The text entry field 620 permits a user to enter another user's e-mail address, name, or other designation. The add button 622 adds the user specified in the text entry field 620 to the invitee display window 623. By checking the exclusivity option 624, access to the newly-created set is restricted to those users specified in the invitee display window 614. If the exclusivity option 624 is not checked, the newly-created set is open to other searching users. The OK button 626, once selected, causes the specified invitees to be stored as recipients for the selected media objects. Recipients automatically receive the selected media objects upon the user's creation of a set. Alternatively, the user may choose not to designate a recipient user, in which no users would automatically receive the selected media objects upon creation of the set.

A create button 628 initiates the process of creating a new set of related media objects to share. The selected media objects may be tagged and the respective tags may be stored on the client computing device 202 or server 206. Alternatively, the selected media objects may be transmitted (via transmission module 306) to and stored on the server 206 and stored. Other methods of storing newly created sets are well known to one skilled in the art and need not be discussed at length herein.

Figure 7:
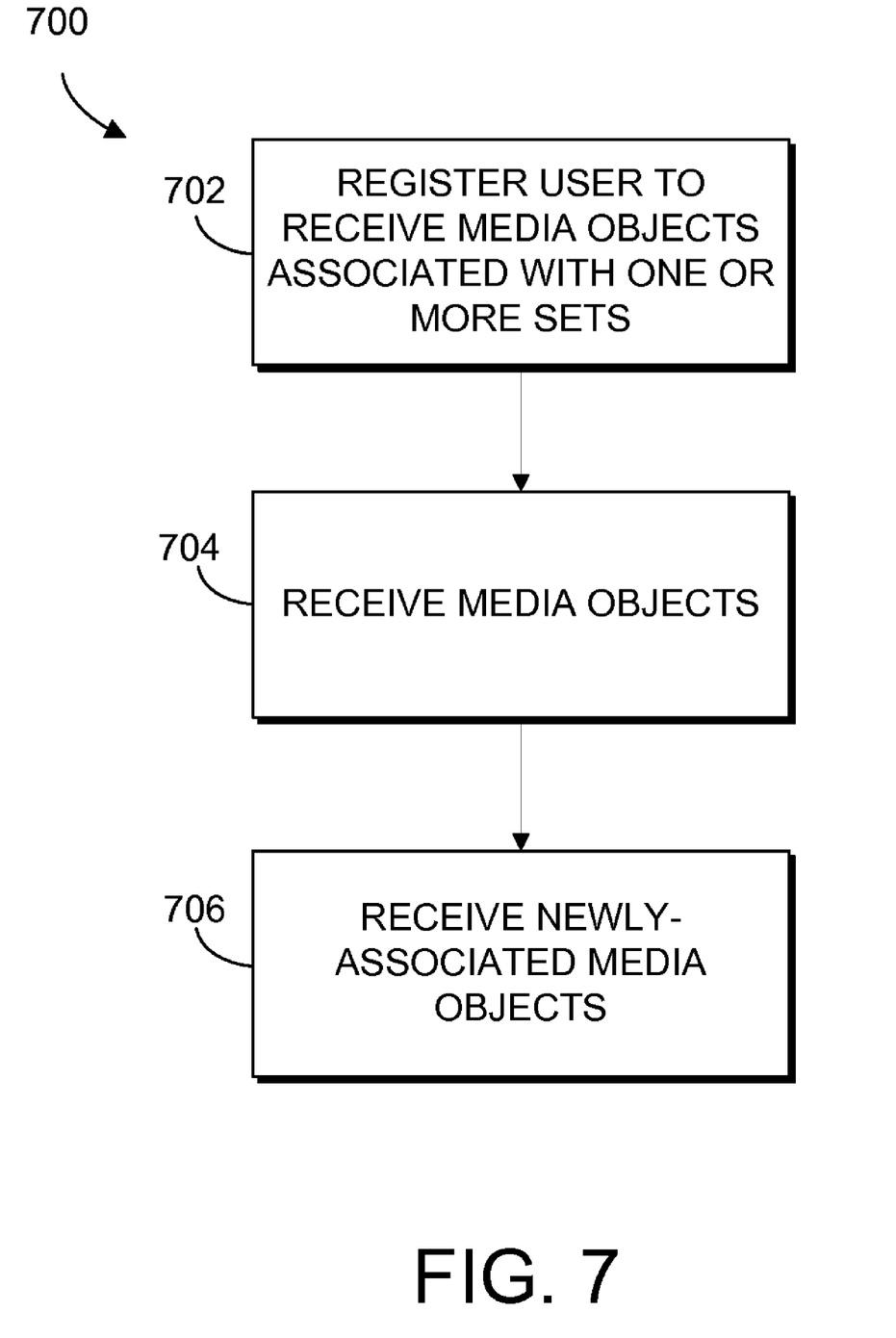
FIG. 7 is a flow diagram illustrating a method for distributing media objects, according to an embodiment of the invention.

FIG. 7 is a flow diagram illustrating a method for distributing media objects, according to an embodiment of the invention. The method is referenced generally as numeral 700. In an embodiment, the user is registered to receive media objects associated with one or more sets of media objects related to a topic, indicated at 702. As previously described, registration can occur either automatically or require input from the user. Once registered, the user receives media objects (typically at a computing device) associated with the sets with which the user has registered, indicated at 704. The user may also receive newly-associated media objects to the set, as indicated at 706.

Figure 8:
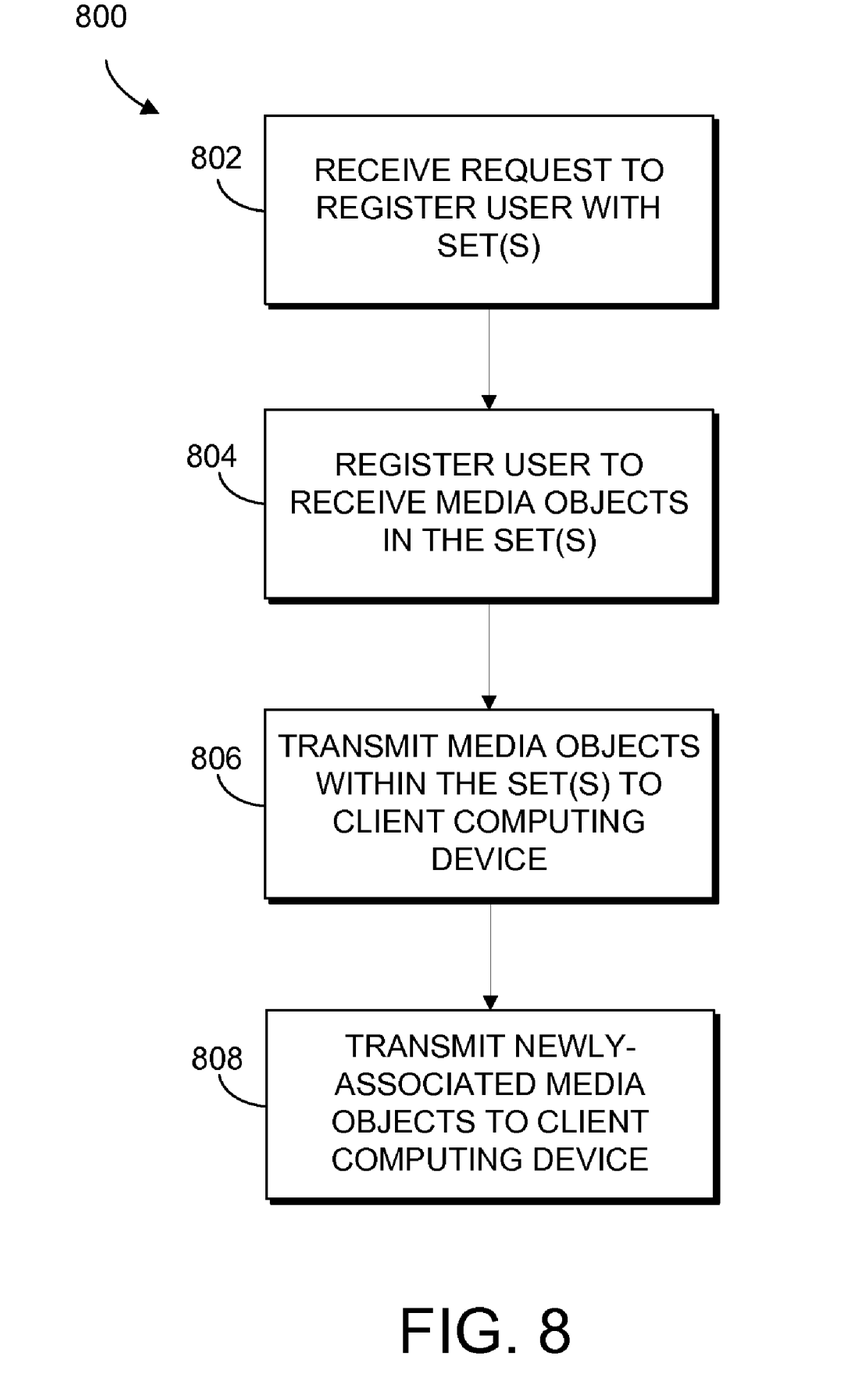
FIG. 8 is a flow diagram illustrating a method for distributing media objects according to an embodiment of the present invention.

FIG. 8 is a flow diagram illustrating a method for distributing media objects according to an embodiment of the present invention. The method is referenced generally as numeral 800. In an embodiment, a request for registering the user to receive media objects associated with one or more sets is received, as indicated at 802. The request may be sent from a client computing device to a server or a remote computing device to authenticate the user. The user is then registered to receive media objects associated with the one or more set, indicated at 804. Once registered, media objects within the set are transmitted to the client computing device, as indicated at 806. Additionally, any newly-associated media objects to the set are also transmitted to the client computing device, as indicated at 808. Once the media objects are received, the client computing device can then display them to the user.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

The invention claimed is:

1. A computer-implemented method comprising:
presenting at least one media object related to a topic to a user for selection;
receiving a user selection of the at least one media object;
performing a query for sets of media objects related to content of the at least one media object, the query being constrained to media objects that have been:
(1) uploaded by members of a designated group who are selected based on a frequency the user has previously shared media objects with the members of the designated group, and
(2) captured by the members of the designated group during a predetermined proximity in time;
analyzing time stamps tagged to each of a plurality of media objects to determine whether a set of one or more media objects exists that share a common parameter and were captured by one of the members of the designated group are related to the topic;
if the set does not exist, creating a new set based on the topic for the at least one-media object; and
if the set does exist, associating the at least one media object with the set upon confirmation from the user to associate the at least one media object with the set.

2. The method of claim 1, further comprising receiving a request from the user to associate the at least one media object with the set.

3. The method of claim 1, further comprising prompting the user to create a new set of one or more media objects related to the topic.

4. The method of claim 1, wherein the at least one media object includes one or more audio files, images, or videos.

5. The method of claim 1, wherein searching for a set of one or more media objects related to a topic further is constrained by a group or relationship constraint of the user.

6. The method of claim 1, wherein associating the at least one media object with the set further comprises tagging the selected media object.

7. The method of claim 1, wherein associating the at least one media object with the set further comprises transmitting the at least one media object to a remote computing device.

8. The method of claim 1, wherein searching for a set of one or more media objects related to the topic further comprises:
receiving an identifier media object identifying the topic; and
using the identifier media object to search for a set of one or more media objects related to the topic.

9. The method of claim 1, further comprising distributing the at least one media object to a second user designated to receive media objects added to the set.

10. The method of claim 1, wherein searching for a set of one or more media objects further comprises determining whether the at least one media object relates to the topic of the one or more media objects within the set based on:
a first time indication and a first location indication associated with the at least one selected media object, and
a second time indication and a second location indication associated with the one or more media objects within the set.

11. A user interface embodied on a computer-readable memory device, the user interface for storing one or more media objects related to a topic as part of a set of one or more media objects related to the topic, the user interface comprising:
a first display area that displays, to a user, the one or more media objects and that receives a user selection of a selected media object included in the one or more media objects:
a second display area that displays a first option for associating the selected media object with a topic-related set of one or more media objects from a plurality of other users in a member group who have been selected based on the frequency the user has previously shared media objects with the other users in the member group, wherein the one or more media objects were selected for the topic-related set based on being captured during a predetermined proximity in time and based on sharing a common parameter included in time stamps;
a third display area that displays a second option for inviting another user to associate media objects with the topic-related set; and
a fourth display area that displays a third option for creating a new set of media objects that share a common parameter, wherein the new set includes the one or more selected media objects.

12. The user interface of claim 11, wherein the second display area further displays an option to locate one or more additional sets to associate with the selected media objects.

13. The user interface of claim 11, wherein the second display area further displays an option to create a new set of one or more media objects related to the topic.

14. A computer system comprising a processor coupled to a computer-readable memory device storing a plurality of computer-executable instructions executable by the processor, the computer-executable instructions configured for associating a media object with a set of one or more stored media objects that capture a topic, comprising:

an application, executable by the processor, configured to:

provide to the user the media object related to the topic;

receive a selection of the media object:

search for a set of one or more media objects related to the topic by searching for sets of media objects from a plurality of users who have been selected based on a frequency the user has previously shared media objects with members of the plurality of users, wherein the one or more media objects in the set are captured by the plurality of users during a predetermined proximity in time and share a common parameter, which is included in time stamps of the one or more media objects; and an association module configured to associate the media object with the set if the set is found by the application, and display an option to create a new set with the media object based on the quantity of time if the set is not found by the application.

15. The computing device of claim 14 further comprising a transmission module to transmit the media object to a remote storage module, wherein the remote storage module stores the one or more objects within the set.

16. The computing device of claim 14, wherein the media object comprises at least one of an audio, video, or image file.

17. The computing device of claim 14, wherein the application constrains searching for media objects that are associated with a group or relationship constraint of the user.

* * * * *